(12) United States Patent
Yim et al.

(10) Patent No.: US 10,071,639 B2
(45) Date of Patent: Sep. 11, 2018

(54) CHARGING SYSTEM OF ELECTRIC VEHICLE

(71) Applicant: Hyundai Motor Company, Seoul (KR)

(72) Inventors: Jeong Bin Yim, Incheon (KR); Jae Hwa Jeon, Gyeonggi-do (KR); Dae Woong Han, Gyeonggi-do (KR); Sang Kyu Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 227 days.

(21) Appl. No.: 14/854,385

(22) Filed: Sep. 15, 2015

(65) Prior Publication Data

US 2016/0236579 A1 Aug. 18, 2016

(30) Foreign Application Priority Data

Feb. 12, 2015 (KR) .................. 10-2015-0021490

(51) Int. Cl.
*H02J 7/00* (2006.01)
*B60L 11/18* (2006.01)
*H02J 7/02* (2016.01)

(52) U.S. Cl.
CPC ....... *B60L 11/1811* (2013.01); *B60L 11/1803* (2013.01); *B60L 11/1805* (2013.01); *B60L 11/1814* (2013.01); *B60L 11/1824* (2013.01); *H02J 7/022* (2013.01); *Y02T 10/7005* (2013.01); *Y02T 10/7072* (2013.01); *Y02T 10/7258* (2013.01); *Y02T 90/12* (2013.01); *Y02T 90/121* (2013.01); *Y02T 90/127* (2013.01); *Y02T 90/14* (2013.01)

(58) Field of Classification Search
CPC .................................................. B60L 11/1814

USPC ......................................................... 320/109
See application file for complete search history.

(56) References Cited

U.S. PATENT DOCUMENTS

| 5,099,186 A | 3/1992 | Rippel et al. |
| 2009/0267215 A1 | 10/2009 | Kitahara et al. |
| 2012/0007551 A1 | 1/2012 | Song et al. |
| 2012/0007552 A1 | 1/2012 | Song et al. |

(Continued)

FOREIGN PATENT DOCUMENTS

| JP | 2011-010426 A | 1/2011 |
| KR | 2012-0005746 A | 1/2012 |

(Continued)

OTHER PUBLICATIONS

Machine translation of KR1020120124814A.*

*Primary Examiner* — David V Henze-Gongola
(74) *Attorney, Agent, or Firm* — Mintz Levin Cohn Ferris Glovsky and Popeo, P.C.; Peter F. Corless

(57) ABSTRACT

A charging system of an electric vehicle is provided and is implemented based on a motor and an inverter which are previously mounted within the electric vehicle, without a separate on-board charger. The charging system includes a DC power supply that is configured to store or output DC power and a motor that is configured to drive the electric vehicle. An inverter drives the motor based on a flow of current and an AC power supply outputs the AC power. Additionally, a charging relay is configured to perform a switching operation to supply DC power output from the inverter to the DC power supply and an input relay is configured to perform the switching operation to supply the AC power to the inverter.

6 Claims, 4 Drawing Sheets

(56) References Cited

U.S. PATENT DOCUMENTS

| | | | | |
|---|---|---|---|---|
| 2012/0056477 A1* | 3/2012 | Herges | ............... | B60L 11/1853 307/10.1 |
| 2012/0262096 A1* | 10/2012 | Lee | ......................... | H02J 7/02 318/139 |
| 2013/0147431 A1 | 6/2013 | Lim et al. | | |
| 2015/0197156 A1 | 7/2015 | Song et al. | | |

FOREIGN PATENT DOCUMENTS

| | | | |
|---|---|---|---|
| KR | 2012-0005747 A | | 1/2012 |
| KR | 10-2012-0121267 A | | 11/2012 |
| KR | 10-2012-0124814 A | | 11/2012 |
| KR | 1020120124814 A | * | 11/2012 |
| KR | 2013-0065408 A | | 6/2013 |
| KR | 10-1509709 B1 | | 4/2015 |
| WO | 2010/030957 A1 | | 3/2010 |

* cited by examiner

CHARGING SYSTEM OF ELECTRIC VEHICLE

CROSS-REFERENCE TO RELATED APPLICATION

This application is based on and claims the benefit of priority to Korean Patent Application No. 10-2015-0021490, filed on Feb. 12, 2015 in the Korean Intellectual Property Office, the disclosure of which is incorporated herein in its entirety by reference.

TECHNICAL FIELD

The present disclosure relates to a charging system of an electric vehicle, and more particularly, to a technology of a charging system connected to an external power supply by a plug-in manner to charge a battery.

BACKGROUND

A plug-in hybrid electric vehicle (hereinafter, collectively referred to as 'MEV') or an electric vehicle (hereinafter, collectively referred to as 'EV') includes a battery that is charged with electric energy required for driving the vehicle from an external alternating current (hereinafter, collectively referred to as 'AC') power supply using on-board charger (hereinafter, collectively referred to as an 'OBC') mounted within the vehicle.

The OBC includes a high voltage switch, an inductor, a capacitor, an insulating transformer, a relay, a control board, a cooling system, and a separate packaging housing the components and is therefore disadvantageous in a size, a weight, and a price. In addition, the OBC which is not required while a vehicle is being driven but is required while a vehicle is being charged is mounted within a vehicle while being separately configured. As a result, a vehicle weight may be increased, which leads to an adverse effect on driving fuel efficiency of a vehicle.

Further, the related art proposes a structure in which an inverter boosts a household power supply to a targeted voltage and a direct current (hereinafter, collectively referred to as 'DC')—direct current (DC) converter forms a simple current pass without performing a switching control to charge the battery. The structure has difficulty of controlling a boost power factor corrector (PFC) when the high voltage battery voltage is less than the household voltage.

When no high voltage DC-DC converter (HDC) is present in the existing motor system configuration, a control is not made when the high voltage battery voltage is less than an input voltage. Accordingly, a separate DC-DC apparatus which may operate as a buck converter is required. Further, the existing inverter integrated charging system structure includes a bidirectional DC-DC converter and performs a boost control using the inverter to boost the input voltage to the battery voltage or greater. Further, the bidirectional converter performs a buck control to buck the input voltage to a targeted battery voltage.

The structure may be applied to a vehicle that includes the bidirectional converter. Further, when there is no bidirectional converter installed within the vehicle, no charging region occurs based on an external input voltage and battery voltage range. In other words, when the battery voltage range is low or AC rectification voltage is greater than battery voltage, no boost charging control region occurs in a low state-of-charge region of the battery.

SUMMARY

An aspect of the present disclosure provides a charging system for an electric vehicle implemented based on a motor and an inverter previously mounted within the electric vehicle without a separate on-board charger. The foregoing and other objects, features, aspects and advantages of the present disclosure will be understood and become more apparent from the following detailed description of the present disclosure. Also, it can be easily understood that the objects and advantages of the present disclosure can be realized by the units and combinations thereof recited in the claims.

According to an exemplary embodiment of the present disclosure, a charging system of an electric vehicle may include: a DC power supply configured to store or output DC power; a motor configured to drive the electric vehicle; an inverter configured to drive the motor based on a flow of current; an AC power supply configured to supply power to the DC power supply; a charging relay configured to perform a switching operation to supply DC power output from the inverter to the DC power supply; and an input relay configured to perform the switching operation to supply the AC power to the inverter.

The input relay may include two input relays disposed across the AC power supply. The charging system of an electric vehicle may further include: two main relays configured to supply the DC power charged in the DC power supply to the motor while the motor is being driven; and an auxiliary capacitor connected in parallel to the DC power supply and disposed between the charging relay and the main relay to store the power charged in the DC power supply.

The charging system of an electric vehicle may further include: an inductor disposed between the charging relay and the inverter. The charging relay may include: a first charging relay disposed between the DC power supply and the inverter and a second charging relay disposed between the motor and the input relay. The second charging relay may be connected in series to a plurality of second charging relays. Two phases of a three-phase switch of the inverter may be used as a boost converter configured to boost (e.g., increase) a voltage to a battery voltage or greater using a boost control. One phase of a three-phase switch of the inverter may be used as a buck converter configured to buck (e.g., decrease) a voltage of a capacitor to a targeted battery voltage using a buck control.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
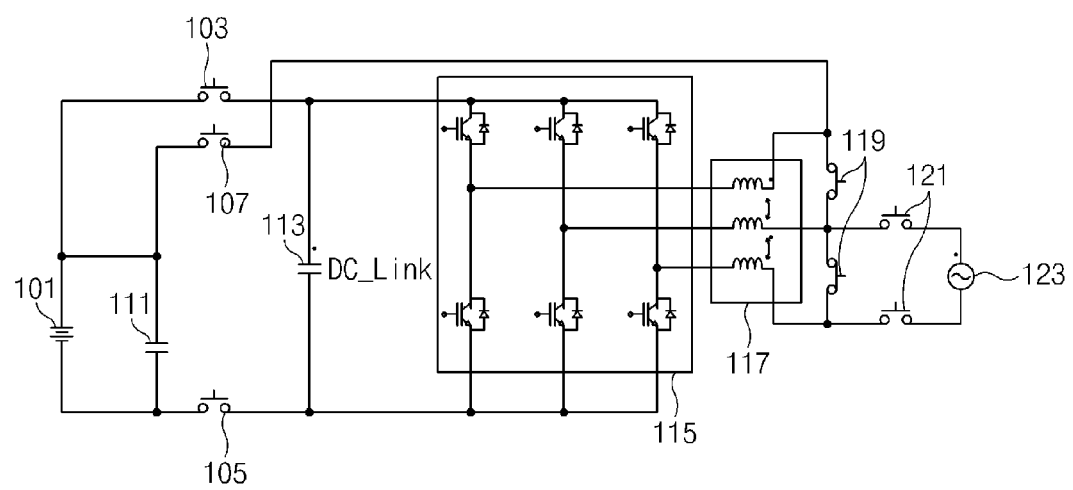
FIG. 1 is an exemplary block diagram of a charging system of an electric vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings so that those skilled in the art may easily practice the present disclosure. However, the present disclosure may be modified in various different ways and is not limited to the embodiments provided in the present description. In the accompanying drawings, portions unrelated to the description will be omitted in order to obviously describe the present disclosure, and similar reference numerals will be used to describe similar portions throughout the present specification.

Hereinafter, a charging system of an electric vehicle according to an exemplary embodiment of the present disclosure will be described in detail with reference to the accompanying drawings. Herein, an electric vehicle may be a plug-in hybrid electric vehicle (hereinafter, collectively referred to as 'PHEV') or an electric vehicle (hereinafter, collectively referred to as 'EV'). The charging system of an electric vehicle according to the exemplary embodiment of the present disclosure may be a charging system connected to an external power supply, which is a commercial power supply, by plug-in manner to charge a battery.

FIG. 1 is an exemplary block diagram of a charging system of an electric vehicle according to an exemplary embodiment of the present disclosure and illustrates an integrated charging system structure of a motor system. Referring to FIG. 1, the charging system may include a direct current (hereinafter, collectively referred to as 'DC') power supply 101, a main relay 1 103, a main relay 2 105, a charging relay 1 107, an auxiliary capacitor (e.g., buck) 111, a DC link capacitor 113, an inverter 115, a motor 117, a charging relay 2 119, an input relay 121, and an alternating current (hereinafter, collectively referred to as 'AC') power supply 123.

In this configuration, the DC power supply 101, the main relay 1 103, the main relay 2 105, the charging relay 1 107, and the auxiliary capacitor (e.g., buck) 111 configure a battery. The battery may be configured to receive DC power from the inverter 115 and store the received DC power in the DC power supply 101. Further, the DC power charged in the DC power supply 101 may be supplied to the motor 117 via the inverter 115.

The inverter 115 may be configured to operate the motor 117 of the electric vehicle based on a flow direction of current. In addition, the inverter 115 may be configured to convert the DC power into AC power. The motor 117 may be connected to the inverter 115 to drive the electric vehicle (not illustrated) and may be driven using alternating current supplied from the battery through the inverter 115. The AC power supply 123 may be the external power supply and may be configured to supply power to the battery.

In particular, according to the exemplary embodiment of the present disclosure, the charging relay 1 107, the charging relay 2 119, and the input relay 121 are parts which are additionally configured in the charging system. Further, although not illustrated in FIG. 1, the auxiliary capacitor (buck) 111 may be a part which is optionally added to the charging system.

In this configuration, the auxiliary capacitor 111 may be a smoothing capacitor configured to absorb a ripple current flowing in the inductor 109 (FIG. 2) to form a DC voltage. Herein, the battery may be configured to operate as a large-capacity capacitor and therefore the auxiliary capacitor may not be required but may be added when being required for control.

The main relay 1 103 and the main relay 2 105 may be configured to perform a switching operation to supply power charged in the DC power supply 101 to the motor 119. In addition, the main relay 1 103 and the main relay 2 105 may be connected across the DC power supply 101 to adjust a voltage and a current input and output to and from the DC power supply 101. The charging relay 1 107, the charging relay 2 119, and the input relay 121 may be configured to supply the AC power from the AC power supply 123 to the battery to perform the switching operation for charging. The charging operation of the charging system of FIG. 1 will be described below.

Figure 2:
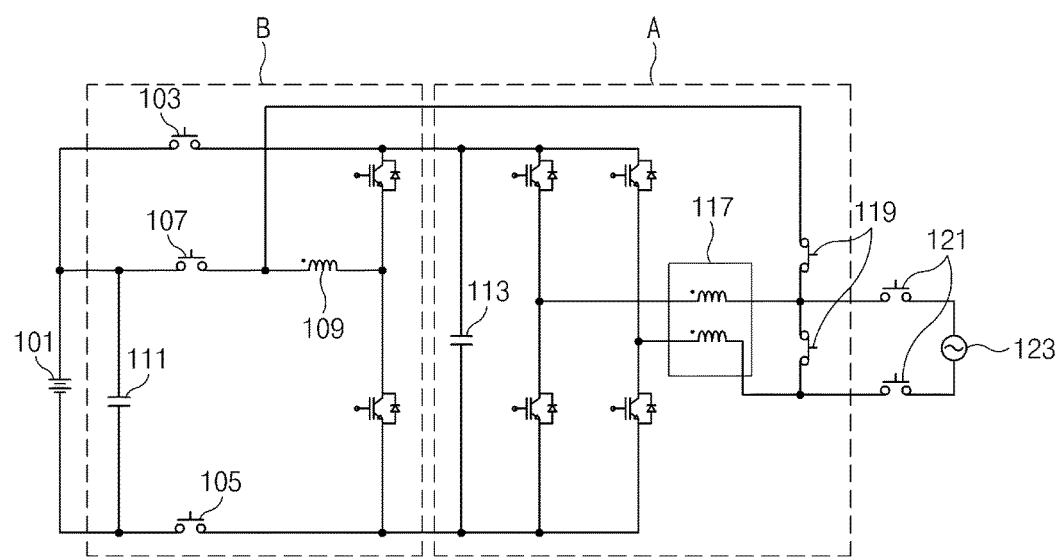
FIG. 2 is an exemplary diagram schematically illustrating the charging system of FIG. 1 according to an exemplary embodiment of the present disclosure.
Figure 3:
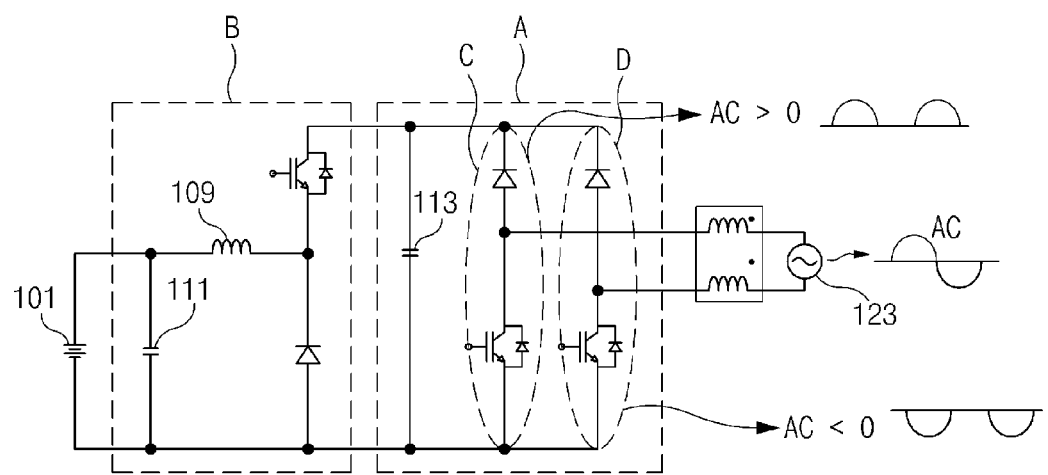
FIG. 3 is an exemplary diagram schematically illustrating the charging system of FIG. 1 at the time of a charging operation according to an exemplary embodiment of the present disclosure.
Figure 4:
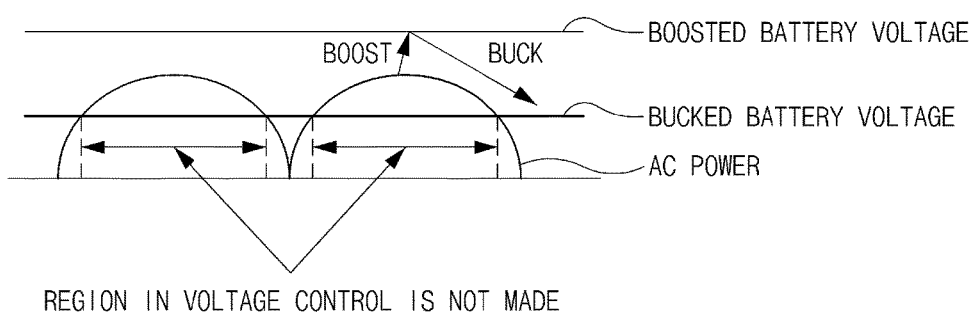
FIG. 4 is an exemplary diagram illustrating a condition of solving a problem region, according to an exemplary embodiment of the present disclosure.

FIG. 2 is an exemplary diagram schematically illustrating the charging system of FIG. 1, FIG. 3 is an exemplary diagram schematically illustrating the charging system of FIG. 1 during a charging operation, and FIG. 4 is an exemplary diagram illustrating a condition for solving a problem region, according to an exemplary embodiment of the present disclosure.

Referring to FIGS. 2 and 3, a circuit wiring may be changed using the main relay 1 103, the main relay 2 105, the charging relay 1 107, the charging relay 2 119, and the input relay 121 as shown in the following Table 1 during charging and a boost converter A and a buck converter B may be configured using a switch of the inverter 115. In particular, the added parts 107, 119, and 121 may be installed extraneous to a power module pack which is a switching device of an inverter and therefore the existing system configuration may be used as it is.

TABLE 1

| Item | Main relay 1 | Main relay 2 | Charging relay 1 | Charging relay 2 | Input relay |
|---|---|---|---|---|---|
| At the time of motor driving | ○ | ○ | X | ○ | X |
| At the time of charging operation | X | ○ | ○ | X | ○ |

The relay may be operated as the above Table 1 while the motor is being driven and during charging to form the circuit wiring. In particular, the AC external power supply 123 may be configured to boost (e.g., increase) a voltage to a battery voltage or greater by performing a boost control using 2 phases among a three-phase switch of the inverter 115. Further, the boosted voltage may be charged in the DC link capacitor 113. The buck control may be performed using one phase of the three-phase switch of the inverter 115 to buck (e.g., decrease) the voltage of the DC link capacitor 113 to the targeted battery voltage. In other words, it may be appreciated that FIG. 1 may be simply changed to FIG. 2 The switching device of the inverter 115 may be configured of three phases, in which two phases may be used as the boost converter A and one phase may be used as the buck converter B.

Particularly, the two phases of the inverter may be used as the boost converter A but the inverter may be expected to have better performance based on a control method connected in parallel as C and D. In addition, one phase C used as the boost converter A may be configured to perform a boost switching operation when the AC power supply 123 is positive [+] and one phase D used as the boost converter A may be configured to perform the boost switching operation when the AC power supply 123 is negative [−], and thus the charging may be configured to perform the boost switching operation without including a separate rectifier.

Therefore, the charging system illustrated in FIGS. 1, 2, and 3 may include the boost converter A and the buck converter B using the switch of the inverter in the structure without the DC-DC bidirectional converter and may be configured to perform the boost switching operation without including the separate rectifier. Accordingly, as illustrated in FIG. 4, the existing problem region may be solved.

In other words, in the configuration of the existing inverter charger according to the related art, only the boost control may be performed by the inductance of the motor and the switch device of the inverter. Therefore, in a high section (e.g., region in which the voltage control of FIG. 4 may not be made) in which the AC input voltage is greater than that of the high voltage battery, the boost voltage control may not be performed. Therefore, there is a section in which the control may not be performed with the desired voltage.

However, according to the exemplary embodiment of the present disclosure, the boost control and the buck control may be performed by the switching device of the inverter without the configuration of the separate buck converter or the bidirectional DC-DC converter. Therefore, the DC-link voltage may be boosted to a region greater than the AC input voltage by the boost control and the DC-link voltage may be again bucked to the desired voltage, that is, the targeted voltage of the high voltage battery by the buck control, thus operating the charging system in the controllable state regardless of the existing problem region as taught in the related art.

The charging system configuration according to the exemplary embodiment of the present disclosure may include the boost converter and the buck converter using the switch of the inverter 211 in the structure without requiring a bidirectional DC-DC converter. Further, the charging system configuration according to the exemplary embodiment of the present disclosure omits the on-board charger (OBC) to contribute to the reduction in the vehicle packaging and weight, thereby increasing the driving efficiency of the vehicle.

As described above, according to the exemplary embodiments of the present disclosure, it may be possible to implement the charging system having the motor and the inverter which are previously mounted within the electric vehicle regardless of the vehicle system configuration using the existing power electronic (PE) parts and the simplified additional apparatus, without using the OBC which is previously mounted in the electric vehicle of the related art. Therefore, it may be possible to implement the charging operation in all the systems using the motor and the inverter, for example, the systems, regardless of whether the system includes one motor, two motors, and the OBC. In addition, it may be possible to improve the packaging performance, reduce the vehicle weight, and greatly reduce the costs against the on-board charger.

Hereinabove, although the present disclosure has been described with reference to restrictive configurations and the accompanying drawings, the present disclosure is not limited thereto, but may be variously modified and altered by those skilled in the art to which the present disclosure pertains without departing from the spirit of the present disclosure and equivalents to the following claims.

What is claimed is:

1. A charging system of an electric vehicle, comprising:
a direct current (DC) power supply configured to store or output DC power;
a motor configured to drive the electric vehicle;
an inverter configured to drive the motor based on a flow of current;
an alternating current (AC) power supply configured to supply power to the DC power supply;
a charging relay configured to perform a switching operation to supply DC power output from the inverter to the DC power supply; and
an input relay configured to perform a switching operation to supply the AC power to the inverter,
wherein the charging relay includes a first charging relay and a second charging relay,
wherein the first charging relay is connected between the DC power supply and the inverter and the second charging relay is connected between the motor and the input relay, and
wherein the second charging relay is connected in series to a plurality of additional relays.

2. The charging system of an electric vehicle according to claim 1, wherein the input relay includes two input relays connected across the AC power supply.

3. The charging system of an electric vehicle according to claim 1, further comprising:
   two main relays configured to supply the DC power charged in the DC power supply to the motor while the motor is being driven; and
   an auxiliary capacitor connected in parallel to the DC power supply and connected between the charging relay and the main relay to store power charged in the DC power supply.

4. The charging system of an electric vehicle according to claim 1, further comprising:
   an inductor connected between the charging relay and the inverter.

5. The charging system of an electric vehicle according to claim 1, wherein two phases of a three-phase switch of the inverter are used as a boost converter configured to boost a voltage to a battery voltage or greater using a boost control.

6. The charging system of an electric vehicle according to claim 1, wherein one phase of a three-phase switch of the inverter is used as a buck converter configured to buck a voltage of a capacitor to a targeted battery voltage using a buck control.

* * * * *